July 11, 1950          M. L. NELSON          2,514,788
ZERO-RESET DEVICE FOR NUMERICAL COUNTERS
Filed Dec. 29, 1945          2 Sheets—Sheet 1
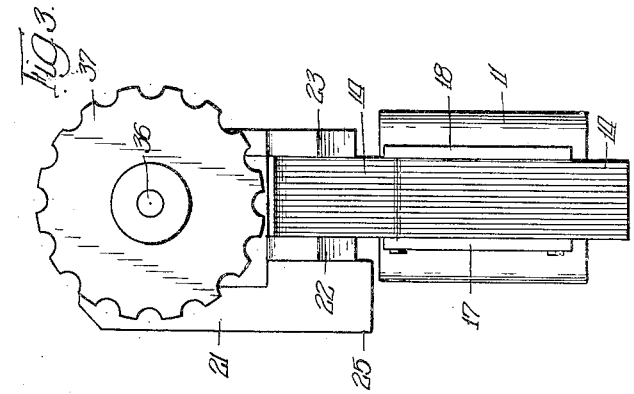
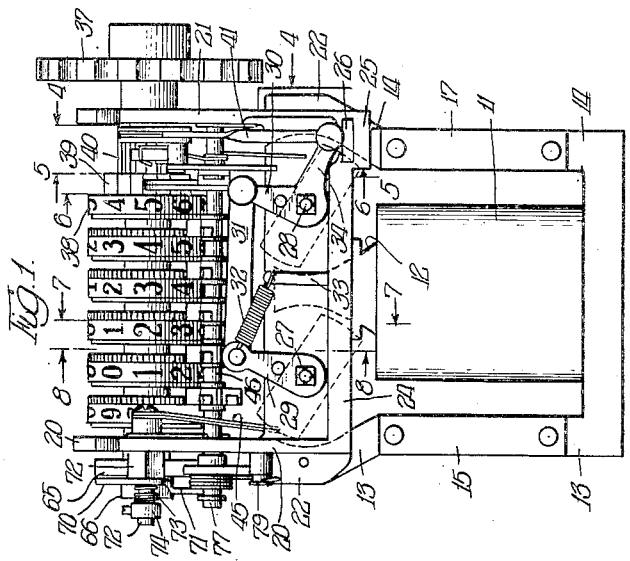
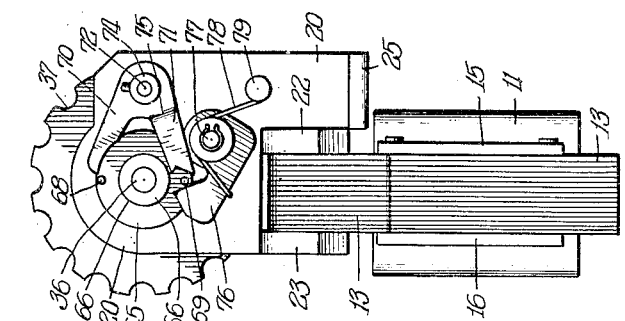
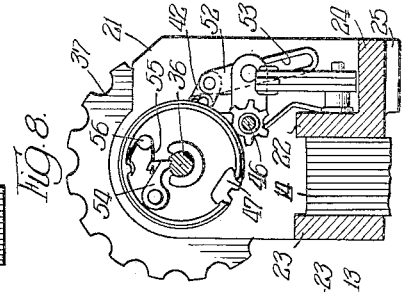
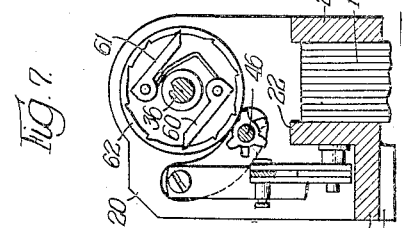
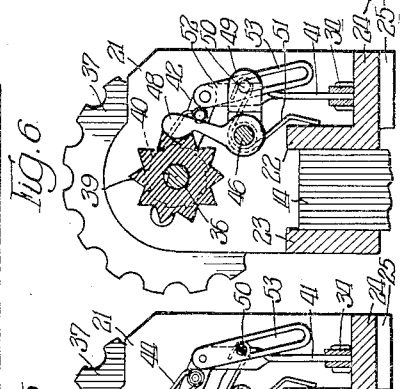
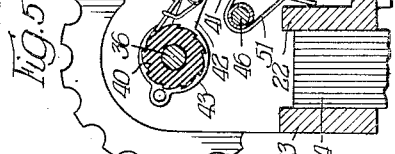
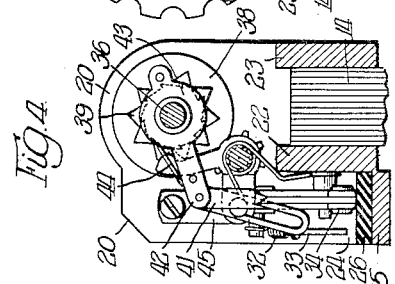
INVENTOR.
Martin L. Nelson,
BY
ATTY.

July 11, 1950  M. L. NELSON  2,514,788
ZERO-RESET DEVICE FOR NUMERICAL COUNTERS
Filed Dec. 29, 1945  2 Sheets—Sheet 2
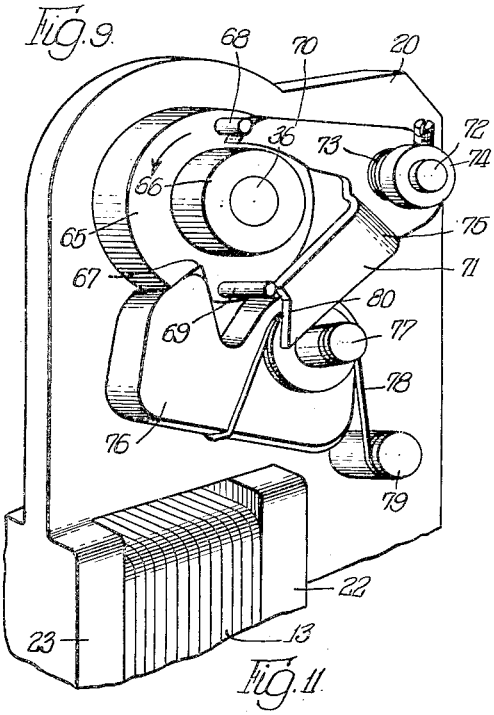
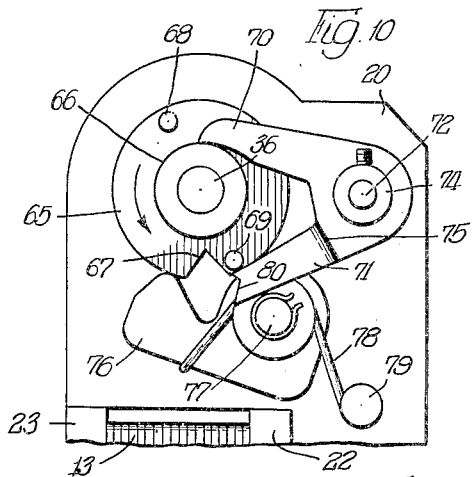
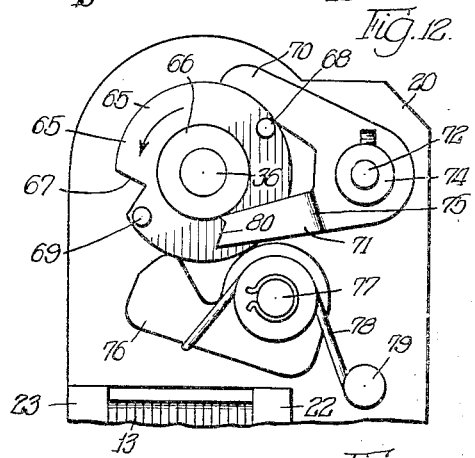
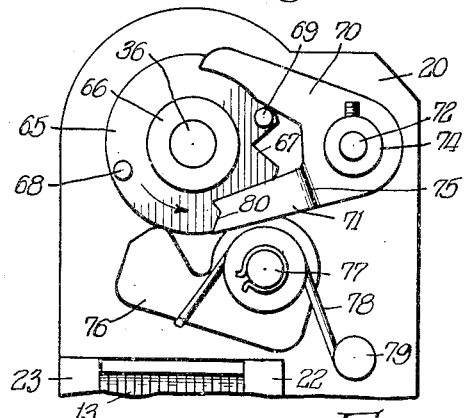
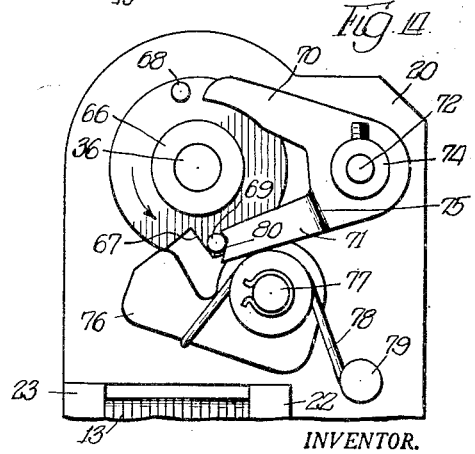
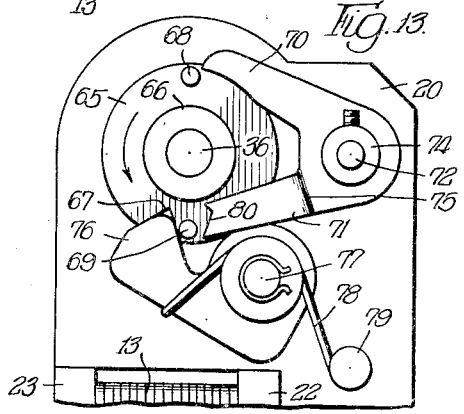
INVENTOR.
Martin L. Nelson
BY
atty.

Patented July 11, 1950

2,514,788

UNITED STATES PATENT OFFICE 2,514,788

ZERO-RESET DEVICE FOR NUMERICAL COUNTERS

Martin L. Nelson, Park Ridge, Ill., assignor to Production Instrument Company, Chicago, Ill., a corporation of Illinois Application December 29, 1945, Serial No. 638,025

9 Claims. (Cl. 235—144)

This invention relates to numerical counters, and is particularly concerned with an improved counter provided with novel means for resetting the number wheels from any advanced position to zero position.

Details of the invention will appear from the following description which is rendered below with reference to the accompanying drawings. In these drawings, Fig. 1 shows an elevation of an embodiment of a counter in front view;

Fig. 2 is an end view of the counter as seen from the left of Fig. 1;

Fig. 3 illustrates an end view of the counter, Fig. 1, as seen from the right;

Figs. 4 and 5 represent sectional views taken approximately along lines 4—4 and 5—5 of Fig. 1, showing the drive mechanism for advancing the units number wheel during the counting operation;

Fig. 6 illustrates the detent mechanism to prevent overdrive of the units number wheel, as seen along lines 6—6 in Fig. 1;

Fig. 7 is a section taken along lines 7—7 in Fig. 1, showing the shaft carrying the number wheels in section and a pawl and ratchet mechanism arranged within each of the number wheels except the units wheel for the purpose of permitting reset rotation of such number wheels responsive to reset rotation of the shaft;

Fig. 8 shows a section taken approximately along lines 8—8 in Fig. 1, illustrating a pawl disposed on each number wheel for engagement with a notch in the shaft so as to drive the number wheels during the reset rotation of the shaft;

Fig. 9 is a perspective fragmentary view, on an enlarged scale, showing the exteriorly visible parts of the zero reset control mechanism in normal position; and Figs. 10–14 show the zero reset mechanism of Fig. 9 in successive operational positions.

The drawings are diagrammatic, not to scale, and are intended for explanatory and illustrative purposes only. Like parts are numbered alike throughout the drawings. Known elements and details will be described only to the extent required for pointing out the invention.

The counter shown in Figs. 1, 2 and 3 comprises an electrical coil 11 mounted on a laminated soft iron center core piece 12. Integral with the core piece are the legs 13 and 14. Each leg is provided with strips 15, 16 and 17, 18, respectively. These strips are held together by screws, thus securing the laminations of the structure. The core piece 12 and the legs 13 and 14 terminate in arcuate pole pieces, indicated in Fig. 1 in dotted lines, forming two magnetic fields for rotatably mounted armatures, one for each field. These armatures are indicated in Fig. 1 in their normal positions by dotted lines. The armatures will rotate in counter-clockwise direction when current is connected to the coil 11. Current delivered to the coil in the form of impulses will cause angular oscillation of the armatures in a manner which will presently appear as the description progresses.

On top of the core piece 12 and the legs 13 and 14 is mounted a frame having end walls 20 and 21 and interconnecting strip-like ribs 22 and 23. The interconnecting strip 22 is provided with a bottom shelf-like member 24. The latter drops down somewhat at the right end of the structure as seen in Fig. 1 to form a recess or well 25 in which is disposed an elastic cushion, for example, a rubber member 26. The purpose of this elastic member will presently be made clear.

The armatures shown in dotted lines in Fig. 1 are rotatably mounted each by means of a shaft as indicated at 27 and 28. The shafts project through and are journalled in the inter-connecting strip member 22, 23 of the frame. The shaft 27 carries a single arm 29 and the shaft 28 carries a double arm 30 provided with an extension 34. These arms 29 and 30—34 are pivotally interconnected by means of a link 31. The arm 29 is biased in clockwise direction by a spring 32 which is anchored at one end of the arm 29 and at the other end on a pin 33 mounted on the shelf-like member 24. Both arms 29 and 30—34 are thus biased in clockwise direction and held in the normal positions in which they are shown in Fig. 1.

The end of the extension 34 of arm 30 is disposed in the recess or well 25, resting therein in normal position on the elastic cushioning member 26. When the armatures (dotted lines in Fig. 1) are angularly displaced within their magnetic fields in counter-clockwise direction, responsive to a current impulse delivered to the coil 11, they will rotate the shafts 27 and 28 and thus rotate in counter-clockwise direction the arm 29 and also the double arm 30—34. Upon cessation of a current impulse affecting the coil 11 the arm 29 and the double arm 30—34 are rotated back to the normal positions, as shown in Fig. 1, by the force of the spring 32, and the end of arm 34 contacts the elastic member 26, thus cushioning the impact of the restoring motion.

Rotatably mounted in the end walls 20 and 21 of the frame is a shaft 36. This shaft is shown in Figs. 4–8 in section. The shaft extends outside of the end wall 20 to the left of the structure, and through the end wall 21 outside to the right of the structure. A peripherally grooved disk 37 is keyed to the shaft for rotating it when it is desired to reset the number wheels of the mechanism to zero. The number wheels are freely rotatable on the shaft. The units number wheel indicated at 38 carries a star wheel 39 and a drive ratchet 40. Each of the remaining number wheels is provided with a gear wheel, as shown in Fig. 1.

Pivotally connected with the arm 34, which extends from the arm 30, is a drive link 41, and pivotally secured to the upper end of this drive link 41 is the extension 42 projecting from a bushing-like drive member 43 which is also rotatably mounted on the shaft 36. The extension 42 carries the pawl 44 which is in engagement with the teeth of the units wheel ratchet 40. The pawl is held against the teeth of the ratchet by means of a spring, as particularly indicated in Fig. 5. Accordingly, when an electrical impulse energizes the coil 11, the armatures shown in dotted lines in Fig. 1 are rotated in counter-clockwise direction, displacing in counter-clockwise direction the arm 29 and the double arm 30—34, thus raising the link 41 and angularly displacing the extension 42 which projects from the bushing-like member 43. This angular displacement of the extension 42 and bushing-like member 43 is in clockwise direction, as seen in Fig. 4 and counter-clockwise as seen in Fig. 5. The pawl 44, pivotally mounted on the extension 42, advances or displaces the ratchet 40 and therewith the star wheel 39 and the units number wheel 38 angularly in clockwise direction, as seen in Fig. 4. The displacement is by one-tenth of a revolution, or one order number, in response to every impulse delivered to the magnet coil 11. The counter-clockwise operative displacement, as seen in Fig. 1, of the arms 29 and 30—34 is cushioned by a leaf spring 45, and the clockwise return motion, of these arms, into normal position, is cushioned, as previously described, by engagement of the arm 34 with the elastic cushioning member 26.

The transfer mechanism, that is to say, the advance by one order number of the tens number wheel when the units wheel has been advanced by ten order numbers, or one full revolution, and the advance of the remaining number wheels each by one order number responsive to a full revolution of the number wheel of lower numerical order, is conventional by means of the so-called Geneva movement. For the sake of completeness, the operation may be briefly described with reference to Figs. 1 and 8.

Underneath the number wheels and somewhat at the side is provided a shaft 46 carrying a number of small gear wheels. Every second tooth on each such gear wheel is axially cut down for coaction with a segmental tooth such as 47 carried by each number wheel (see Fig. 8). When a number wheel has been advanced by ten steps, or one full revolution, the segmental tooth 47 will engage a full tooth on its coacting transfer gear wheel, rotating the transfer gear wheel on the shaft 46, and the latter in turn will rotate by one step, or one-tenth of a revolution, the associated gear wheel coacting with the corresponding number wheel of the next higher numerical order. The tens number wheel is thus advanced one-tenth of a revolution, or one number, for each full revolution of the units wheel. Ten revolutions of the units wheel produces one full revolution of the tens wheel, bringing the tens wheel back to zero, and the next higher numerical order or digit wheel will be advanced by one number, and so forth, throughout the recording of a count.

Over-travel of the units wheel is prevented by the detent 48 coacting with the star wheel 39. The detent action is particularly apparent from Figs. 5 and 6, the detent head being marked by numeral 48. The detent is rotatably mounted on the transfer gear wheel shaft 46 and carries an extension 49. A pin 50 projects from the extension 49, and a spring 51 is coiled around the shaft 46, one end engaging the pin 50 and the other end engaging and resting against the interconnecting strip-like member 22 of the frame. Accordingly, the detent 48 is biased in counter-clockwise direction, as seen in Fig. 6, into engagement with the star wheel 39. When the units wheel, of which the star wheel 39 and the ratchet 40 are parts, is rotated as previously described, in counter-clockwise direction, as seen in Fig. 6, the head of the detent 48 will fall into the grooves between the radial projections of the star wheel. Pivotally mounted on the extension 42 of the bushing-like member 43, which is rotatable on the shaft 36, is an arm 52 which is slotted at its lower end as shown in Figs. 5, 6 and 8 at 53. The pin projection 50 extending from the arm 49 of the detent rides in the slot 53. Accordingly, when the drive link 41 is displaced upwardly so as to advance the pawl 44 for the purpose of rotating the units wheel by one-tenth of a revolution, or one order number, the members 52 carrying the slot 53 will also be displaced upwardly, and at the end of the stroke, that is, at the end of the one-tenth of a revolution angular motion of the units wheel, the extension 49 of the detent will be carried upwardly, tending to rotate the detent 48 in counter-clockwise direction, as seen in Fig. 6, thus pressing the detent head 48 into the groove between the corresponding projections of the star wheel to prevent over-travel from the angular position to which the star wheel and therewith the units wheel have been advanced.

The shaft 36 carrying the number wheels is provided with a longitudinal groove which extends from about the position of the units wheel to and including the position of the last number wheel at the left of the structure, as shown in Fig. 1. Coacting with this groove are pawls or dogs such as 54 shown in Fig. 8. Each number wheel is provided with such a pawl which is biased in clockwise direction, as shown in Fig. 8, by means of a spring 55 coiled around a post 56. It will be seen from Fig. 8 that the number wheel, e. g., the units wheel, when it is advanced in counter-clockwise direction by the pawl 44 (Figs. 5 and 6) will carry along its pawl 54 and that the pawl will slip out of the groove in the shaft 36 and permit rotation of the number wheel without hindrance. Contrariwise, when the shaft, as seen in Fig. 8, is rotated in counter-clockwise direction, it will catch the pawl 54 in its groove and will rotate the number wheel accordingly. The latter operation takes place when the counter is reset to zero.

The number wheels are advanced in the operation of the counter from one numerical position to the other to record a count. The counter may be provided with a suitable cover, not shown, and in the cover may be a sight opening through which is displayed the number to which the counter is advanced. The resetting of the number wheels to zero position from any advanced numerical position is under the control of the mechanism which will now be described in detail.

The reset mechanism comprises the disk or hand wheel 37 which is keyed to the shaft 36 at one end thereof. The shaft 36 can thus be rotated by the disk 37. The reset operation is accomplished by rotating shaft 36 in clockwise direction as seen in Figs. 3, 4 and 7, and in counter-clockwise direction as seen in Figs. 5, 6 and 8. The shaft is rotated in this manner independently of the number wheels which are held against rotation, the units wheel 38 being held by the detent 48 and the remaining number wheels being held by engagement of their associated gear wheels with the corresponding coacting transfer gear wheels.

During the rotation of the shaft 36, the longitudinal groove in the shaft is displaced angularly with respect to the dogs or pawls 54 (see Fig. 8) on the various number wheels, which have been angularly advanced in accordance with the number set on the counter. It will first pick up the pawl of the number wheel or wheels which are in least angularly advanced position. The pawl 54 of such number wheel will fall into the groove in the shaft 36. Further rotation of the shaft 36 tends to rotate this number wheel. Normally the rotation would be impossible, since the number wheel is held against rotation as previously described. In the case of the units wheel, the force of the detent pawl 48 resting against the star wheel 39 (Fig. 6) is overcome by the torque on the shaft applied to the reset disk 37. The remaining wheels are held against rotation by their gear wheels and associated transfer gears. In order to permit reset rotation of these number wheels, I have separated the gear of each such number wheel from the body of the drumlike member carrying the numbers, and have provided on the associated gear wheel a pair of pawls 60 and 61 for ratchet engagement with ratchet grooves in the rim 62 of the corresponding number wheel, as shown in Fig. 7. Therefore, when the reset operation proceeds, as above described, rotating the shaft 36 in counter-clockwise direction as seen in Fig. 8 and in clockwise direction as seen in Fig. 7, the groove in the shaft 36 picks up the pawls 54 of the number wheels and rotates these number wheels while the gear of each number wheel is held stationary by the associated transfer gear. The number wheel carrying the rim 62 shown in Fig. 7 can thus rotate in clockwise reset direction as a consequence of the clockwise reset rotation of the shaft 36 while its associated gear wheel remains stationary, the pawls 60, 61 projecting from the gear wheel inside of the drum of the number wheel and coacting with the grooves in its rim or wall. Reset rotation of each remaining number wheel proceeds in the same manner.

The reset rotation of the shaft is completed after it has been advanced through a full 360° revolution. The number wheels are then angularly aligned and display "0" through the sight opening. The pawls 54 (Fig. 8) of all number wheels are in engagement with the longitudinal groove in the shaft. Over-travel from the accomplished reset position would cause display, successively, of the numerals 1, 2, 3, etc., on the number wheels until the wheels are again in zero position. In order to prevent such over-travel, I have provided the reset control mechanism disposed at the left of the structure, as seen in Fig. 1 and particularly shown in Figs. 2 and 9–14, inclusive.

The reset control mechanism comprises a flanged member 65 mounted on the shaft 36 and having a hub 66. The flange of member 65 is provided with a notch 67. Attached to the flange are pins 68 and 69, the pin 68 constituting a control pin and the pin 69 a stop pin. As seen particularly in Fig. 9, the control pin 68 is shorter than the stop pin 69. A forked member having the arms 70 and 71 is pivotally mounted on a post 72 projecting from the side wall 20 of the frame, and is frictionally held by means of a spring 73 secured by a sleeve member 74. The arm 70 constitutes a control arm and the arm 71 is the stop arm of the structure. The stop arm 71 is crimped, as indicated at 75, and is thus raised from the plane of the control arm 70. A detent 76 is pivotally mounted on post 77 and is held biased in clockwise direction by a spring 78 anchored at one end on the post 79. The relatively long stop pin 69 coacts with the stop arm 71, and the relatively short control pin 68 coacts with the control arm or extension 70 for placing the stop arms 71 in angular stop position for stop engagement with the stop pin 69.

In normal position, at the start of a counting operation, the reset mechanism is in the position shown in Fig. 9. The detent 76, being biased in clockwise direction, has engaged the notch 67 in the flange 65, holding the flanged member and therewith the reset shaft 36 against inadvertent rotation. The counting operation can proceed, advancing the number wheels on the shaft 36, as previously described, so as to record a count. The control pin 68 rests on top of the free end of the control arm 70, holding this arm as well as the stop arm 71 against clockwise displacement. When resetting to "0" is decided upon at the conclusion of a counting operation, or for any reason, during a counting operation, which is interrupted, the disk or hand wheel 37 is rotated in clockwise direction as shown in Fig. 3, thus rotating the reset shaft 36 in clockwise direction as seen in Figs. 3, 4 and 7, and in counter-clockwise direction as seen in Figs. 2, 5, 6, 8 and 9. The pawls such as 54 (Fig. 8) of the various number wheels are successively picked up by the longitudinal groove in the reset shaft 36, as explained before, rotating the number wheels successively to zero position, until the shaft has described a full revolution of 360°, when all pawls 54 of all number wheels are in engagement with the longitudinal groove in the shaft 36. The shaft is then definitely and positively stopped.

The operational positions of the reset control mechanism during the reset rotation of the shaft 36 will now be explained in detail with reference to Figs. 2 and 9–14.

During the initial rotation of the shaft 36 and therewith of the flanged member 65 from the position shown in Fig. 9, the short control pin 68 is removed from engagement with the control arm 70 and the long stop pin 69 begins to ride up on the stop arm 71 (see Fig. 10) which by its crimp is elevated from the plane of the arm 70. The control arm 70 and the stop arm 71 are thus slightly angularly displaced in counterclockwise direction. The notch 67 in the flange 65 has been angularly moved to disengage the detent 76.

Further angular rotation of the shaft 36, in counter-clockwise direction, as seen in Figs. 2 and 9–14, brings the reset control mechanism into the position shown in Fig. 11. The stop pin 69 engages the control arm 70, lifting this arm and thereby displacing the stop arm 71 angularly clockwise, as seen in Fig. 11, to position its free notched end 80 in the path of the arc described by the stop pin 69.

The control pin 68, in continued reset rotation of the shaft 36 moves underneath the stop arm 71 and assumes the position shown in Fig. 12 in which it lifts the control arm 70 and therewith the stop arm 71 further in clockwise direction, disposing the notched left end 80 of the stop arm 71 in the path of the stop pin 69. The detent 76 rides on the flange 65 and the notch 67 in the flange is coming near to the position in which the detent 76 can fall into it, being biased in clockwise direction by the spring 78.

We then come to the position indicated in Fig. 13. The detent 76 falls into the notch 67 in the flange 65 of the bushing, the control pin 68 is out of engagement with the control arm 70 and the stop pin 69 is disposed just in front of the free notched end 80 of the elevated stop arm 71. The shaft 36 has described one full revolution of 360°. The mechanism is also shown in this position in Fig. 2.

Further rotation of the shaft 36, just slightly in excess of 360°, brings the reset control into the final stop position shown in Fig. 14. The detent 76 partially leaves the notch 67, resting at the edge thereof and ready to fall in again, and the stop pin 69 engages the notched free end 80 of the stop arm 71, thereby preventing further rotation of the reset shaft. It will be observed, however, by comparing Figs. 13 and 14, that the stop pin 69 first contacts the slope of the lower side of the notch 80 of stop arm 71, thus rotating the two arms 70 and 71 slightly in counter-clockwise direction incident to attaining its stop position, Fig. 14, when the stop pin 69 is in engagement with the notch 80 in the free end of stop arm 71. The amount of rotation in excess of 360° is very slight and insufficient to advance the number wheels from their zero positions by a full step.

When the torque on the reset disk 37 is released, the spring pressure on the detent 76 (Fig. 14) exerts itself and the detent falls into the notch 67 in the flange 65. The flanged member and therewith the shaft 36 rotate back in clockwise direction, as seen in Fig. 14, by the slight angular amount corresponding to the amount by which the shaft 36 was rotated in excess of 360°, which brings the reset control back to its normal position, as shown in Fig. 9. The short control pin 68, rotating with the flange 65 into normal position, engages the free end of the control arm 70, rotating this arm and therewith the stop arm 71 in counter-clockwise direction to return these arms to normal position for subsequent reset operation.

It will be seen from the foregoing that the present zero reset mechanism requires only a 360° revolution to bring the number wheels back to "0" from any position to which they may have been advanced. The control mechanism provides a definite and positive stop at a point slightly in excess of a 360° displacement, preventing over-travel. The action is positive and simple, requiring nothing of the operator but rotation of the reset disk or wheel 37 until the stop position shown in Fig. 13 is attained. Release of the reset wheel 37 restores the parts to initial position, ready for subsequent reset operation.

Changes may be made within the scope and spirit of the accompanying claims in which is defined what is considered new and desired to have protected by Letters Patent of the United States.

I claim:

1. A reset control mechanism for coaction with the rotatable reset shaft of a numerical counter comprising a flanged member keyed to said shaft and rotatable therewith, a pair of pins carried by said flanged member, said pins projecting axially from said flanged member and being rotatable therewith responsive to torque applied to said reset shaft to effect rotation thereof during a reset cycle, one of said pins being relatively long and constituting a stop pin and the other pin being relatively short and constituting a control pin, a pivotally mounted forked member having two arms for coaction with said pins, one of said arms constituting a control arm, a camming surface formed at the free end of said control arm, the other arm being displaced from the plane of said control arm and constituting a stop arm, means for holding said forked member in predetermined normal angular position with the free end of said stop arm disposed out of the path of initial arcuate motion of said stop pin, means for applying torque to said shaft for rotating it to effect a reset cycle, thereby rotating said flanged member to cause angular displacement of said pins with respect to the arms of said forked member, said stop pin during its displacement engaging said control arm to rock said forked member so as to move its arms from normal predetermined angular position into actuated angular position in which said stop arm is in preparatory stop position with its free end disposed in the arcuate path of motion of said stop pin, said control pin thereafter during further rotation of said flanged member engaging the control arm of said forked member to maintain the preparatory stop position of said stop arm for stop engagement of its free end by said stop pin to stop rotation of said flanged member and said shaft at the conclusion of angular displacement thereof slightly in excess of 360°, and means effective upon cessation of torque applied to said shaft for rotating said flanged member in opposite direction of rotation by the amount of its angular displacement in excess of 360° to cause said control pin to move said control arm by engagement with the camming surface formed at the free end thereof, thereby angularly displacing said forked member to return it to normal angular position in which said stop pin is freed for coaction with said control arm responsive to initiation of a subsequent reset cycle.

2. The mechanism as set forth in claim 1, wherein said pins are displaced on said flanged member by 180°.

3. The mechanism as set forth in claim 1, wherein the free end of said stop arm is notched for stop engagement by said stop pin.

4. The mechanism as set forth in claim 1, wherein the free end of said stop arm is notched for stop engagement with said stop pin, said notch forming a camming surface for engagement by and coaction with said stop pin during rotation of said flanged member in excess of 360°, whereby said forked member is partially rocked in opposite direction to position the camming surface formed at the free end of said control arm for engagement by said control pin to effect the angular displacement of said forked member to return it to normal angular position as specified in claim 1.

5. The mechanism as set forth in claim 1, together with a pivotally mounted resiliently angularly inwardly biased detent, a notch formed in said flanged member peripherally thereof for receiving said detent, said detent being out of engagement with said notch during the reset rotation of said shaft and said flanged member and falling thereinto at the conclusion of said 360° rotation thereof, the rotation of said shaft and said flanged member in excess of 360° causing partial removal of said detent from said notch to place angular pressure on said flanged member for the purpose of rotating it in opposite direction of rotation by the amount of its angular displacement in excess of 360°, upon cessation of torque applied to said shaft, whereby said stop pin is retracted from engagement with the free end of said stop arm while said control pin is caused to move said control arm by engagement with the camming surface formed at the free end thereof to displace said forked member angularly so as to return it to normal position as specified in claim 1.

6. The mechanism as set forth in claim 1, wherein a notch is formed in said flanged member peripherally thereof, the means for rotating said flanged member in opposite direction of rotation by the amount of its angular displacement in excess of 360° being a pivotally mounted angularly inwardly biased detent for engagement with said notch.

7. A zero-reset device for a numerical counter comprising a rotatable shaft carrying number wheels, means for applying torque to said shaft to rotate it so as to effect a reset cycle, a disklike member carried by said shaft and rotatable therewith, a pivotally mounted angularly resiliently inward biased detent for engagement with a V-shaped notch formed in said disklike member peripherally thereof to hold said disklike member and therewith said shaft in predetermined angular position, a pivotally mounted forked member forming two arms, one arm constituting a control arm, a camming surface formed at the free end of said control arm, the other arm being displaced from the plane of said control arm and constituting a stop arm, a relatively short control pin and a relatively long stop pin carried by said disklike member, said control pin being in normal angular position of said disklike member in engagement with the camming surface formed at the free end of said control arm to hold said forked member in normal position in which said stop arm is in angularly retracted normal position with its free end out of the initial arcuate path of motion of said stop pin which said stop pin describes incident to reset rotation of said shaft and said disklike member, said stop pin moving during initial rotation of said disklike member, responsive to rotation of said shaft during a reset cycle, alongside said stop arm and engaging said control arm during further rotation for the purpose of angularly displacing said forked member and therewith said stop arm to move such stop arm into preparatory stop position with its free end disposed in the path of motion of said stop pin for stop engagement thereby upon completion of rotation of said shaft and said disklike member slightly in excess of 360°, said detent being thereafter operable, upon cessation of torque applied to said shaft, to cause rotation of said disklike member in return direction by the amount of its angular displacement in excess of 360°, said control pin engaging the camming surface at the free end of said control arm during such return rotation to move said forked member and therewith said stop arm to normal angular position with respect to said stop pin to free said stop pin for operation during a subsequent reset cycle.

8. The structure as set forth in claim 7, wherein said control pin passes underneath said stop arm and engages said control arm along its edge during progressive rotation of said disklike member to maintain said forked member and therewith said stop arm in preparatory stop position in which it has been placed by the operation of said stop pin in coaction with said control arm.

9. In a zero-reset mechanism for a numerical counter having a rotatable shaft carrying number wheels, a pair of pins carried by said shaft at one end thereof and axially extending therefrom, one of said pins constituting a control pin and the other pin constituting a stop pin, detent means for holding said shaft and the pins thereon in predetermined normal angular position, a pivotally mounted forked member forming a control arm and a stop arm, respectively, means for holding said forked member in any position of angular displacement, a camming surface formed at the free end of said control arm, said control pin being disposed in normal angular position of said shaft above the free end of said control arm and overlying the camming surface formed thereat to secure said control arm and therewith said forked member and said stop arm in normal angular position with the free end of said stop arm out of the path of arcuate travel of said stop pin, means for applying torque to said shaft to rotate it for the purpose of effecting a reset cycle during which said number wheels are set to zero from any numerical position to which they may have been advanced, said control pin moving away from the camming surface of said control arm at the inception of said reset rotation and said stop pin moving alongside said stop arm into engagement with said control arm to displace it and therewith said forked member and said stop arm angularly so as to position the free end of said stop arm in preparatory stop position in the path of arcuate travel of said stop pin, for stop engagement by said stop pin at the conclusion of reset rotation of said shaft slightly in excess of 360°, said detent means being thereafter effective, upon cessation of said torque applied to said shaft, to rotate said shaft and said pins thereon in return direction, by the amount of angular overtravel in excess of 360°, to cause said control pin to engage said camming surface at the free end of said control arm so as to move said control arm and therewith said forked member and said stop arm into normal angular position with the free end of said stop arm again out of the path of initial angular travel of said stop pin to free said stop pin for operation during a subsequent reset cycle.

MARTIN L. NELSON.

REFERENCES CITED

The following references are of record in the file of this patent:

UNITED STATES PATENTS

| Number | Name | Date |
| --- | --- | --- |
| 876,295 | Carney | Jan. 7, 1908 |
| 903,866 | Julihn | Nov. 17, 1908 |
| 2,143,584 | Spaunburg | Jan. 10, 1939 |